Patented June 30, 1942

2,288,315

UNITED STATES PATENT OFFICE 2,288,315

INTERPOLYMERIZATION PRODUCT OF A DIALLYL ETHER AND AN UNSATURATED ALKYD RESIN

Gaetano F. D'Alelio, Pittsfield, Mass., assignor to General Electric Company, a corporation of New York No Drawing. Application December 1, 1939, Serial No. 307,147

15 Claims. (Cl. 260—42)

This invention relates to the production of new materials having valuable and characteristic properties that make them especially suitable for use in industry, for example in molding, laminating, casting, coating and adhesive application, and for other purposes. The invention is concerned more particularly with compositions of matter comprising an interpolymer (copolymer) or interpolymers of at least one modified or unmodified polyhydric alcohol ester of an alpha unsaturated alpha beta polycarboxylic acid, which esters are designated generally hereinafter for purpose of brevity as "unsaturated alkyd resins," and at least one diallyl compound of the formula

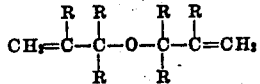

where R is hydrogen or any alkyl radical, e. g., methyl, ethyl, propyl, butyl, amyl, and other straight- and branched-chain members of the homologous series, including, the higher alkyl radicals such as decyl, dodecyl, cetyl, etc. Diallyl compounds having the above formula are designated generally hereinafter for purpose of brevity as "diallyl ethers" or as "a diallyl ether."

The diallyl ethers used in carrying the present invention into effect are, in themselves, not active polymerizing bodies. This is evidenced by subjecting them to heat, say of the order of 50° to 100° C., in the presence of a super-peroxide such as acetyl or benzoyl peroxide. Whereas vinyl acetate or ethyl methacrylate, for example, are converted to a solid polymer in less than 5 hours at 100° C. when admixed with 1% by weight benzoyl peroxide, a diallyl ether, specifically diallyl ether and dimethallyl ether, shows little or no increase in viscosity under a similar treatment.

On the other hand, the unsaturated alkyd resins are unsuited, even in the presence of peroxides, for the preparation of practically useful massive bodies. With or without peroxides or other polymerization catalysts, however, they may be applied in film form and, under the influence of heat or light, or heat and light, may be converted in a reasonable time to a cured film. But, if effort be made to prepare commercially useful massive bodies from the unsaturated alkyds alone, heat treatment even for 24 hours in the presence of a polymerization catalyst such as super-peroxides gives unsuitable materials, that is, they generally lack the strength, hardness and toughness required for the usual service applications.

It was therefore quite surprising and unexpected to find that by copolymerizing a diallyl ether and an unsaturated alkyd resin, interpolymers were obtained having properties quite different from the properties of the individual components when polymerized under the same conditions. The properties of the interpolymers range, for example, from hard, tough, insoluble and infusible bodies both in film form and when cast or molded in large masses to softer, flexible bodies or rubbery masses. In general, the properties of these new products are such as to render them suitable for a wide variety of technical applications.

Another practical advantage accruing from my invention is that the diallyl ethers are good dispersion agents for polymerization catalysts such as super-peroxides, which catalysts are dissolved or dispersed in the unsaturated alkyd resins alone only with great difficulty.

In carrying the present invention into effect an esterification product of a polyhydric alcohol and an alpha unsaturated alpha beta polycarboxylic acid is first prepared in accordance with technique now well known to those skilled in the alkyd resin art. Any polyhydric alcohol containing at least two esterifiable aliphatic hydroxyl groups, or mixtures of such alcohols, may be used in preparing the unsaturated alkyd resin. Examples of such polyhydric alcohols are ethylene glycol, di-, tri- and tetra-ethylene glycols, propylene glycol, trimethylene glycol, thiodiglycol, glycerine, pentaerythritol, etc. Any alpha unsaturated alpha beta polycarboxylic acid, or mixtures of such acids, may be reacted with the polyhydric alcohol or alcohols to form the unsaturated alkyd resin. Examples of such polycarboxylic acids are maleic, monohalomaleic, fumaric, monohalofumaric, citraconic, mesaconic, acetylene dicarboxylic, aconitic, itaconic and its homologues as, for instance, alpha methyl itaconic acid, alpha alpha dimethyl itaconic acid, etc. If available, anhydrides of these polycarboxylic acids may be employed.

In some cases, instead of using an unmodified unsaturated alkyd resin I may use an unsaturated alkyd resin which has been internally modified by replacing a part, say up to about 75 mol per cent, of the unsaturated polycarboxylic acid with saturated aliphatic polycarboxylic acids such as succinic, adipic, glutaric, pimelic, sebacic, azelaic, suberic, tricarballylic, etc., or with aromatic polycarboxylic acids, e. g. phthalic, benzoyl phthalic, terephthalic, benzophenone dicarboxylic, etc. Such acids also may be considered as being non-ethylenic polycarboxylic acids. Anhydrides of these acids, if available, also may be used.

The term "polycarboxylic acid" as used generally herein and in the appended claims therefore is intended to include within its meaning the anhydrides of the acids.

The esterification products of polyhydric alcohols with ethylenic polycarboxylic acids (or with ethylenic and non-ethylenic polycarboxylic acids) may be further modified by introducing as a reactant in the preparation of the alkyd resin a mono-esterifiable compound or compounds, more particularly a saturated or unsaturated normal or isomeric monohydric alcohol, or mixtures thereof, a saturated or unsaturated monocarboxylic acid, or mixtures thereof, or both such esterifiable monohydroxy organic compounds. Examples of monohydric alcohols which may be used as modifiers of the alkyd resin are propyl, isopropyl, butyl, isobutyl, amyl, isoamyl, hexyl, octyl, decyl, dodecyl, tetradecyl, cetyl, octadecyl, allyl, methallyl, 1-chlorallyl, 2-chlorallyl, crotyl, cinnamyl, 2-hydroxy butene-1, etc. The use of methyl and ethyl alcohols is not precluded, but in general these alcohols are less satisfactory because of their lower boiling points. As monobasic acids may be used, for example, the unsubstituted saturated and unsaturated normal or isomeric monocarboxylic acids containing only one esterifiable group such as acetic, propionic, butyric to stearic, inclusive, benzoic, acrylic, methacrylic, cinnamic, etc., acids of drying, semi-drying and non-drying oils, e. g., the acids of tung oil, linseed oil, soya bean oil, castor oil, etc. The mono-esterifiable compound may be introduced into the esterification product before, during or after the esterification of the polyhydric alcohol with the polycarboxylic acid under conditions that interesterification of the mono-esterifiable compound with the incompletely esterified polyhydric alcohol-polycarboxyl acid reaction product is attained. That is, the mono-esterifiable compound must be introduced into the reaction mass before all of the acid groups of the polybasic acid or all of the alcohol groups of the polyhydric alcohol have been esterified.

The term "unsaturated alkyd resin" as used generally herein and in the appended claims is intended to include within its meaning both unmodified esterification products of a polyhydric alcohol with an alpha unsaturated alpha beta polycarboxylic acid and esterification products of the said components which have been modified, for example, as above briefly described.

To achieve copolymerization of the unsaturated alkyd resin with the diallyl ether, a solution of the said resin in the said ether first preferably is effected. The diallyl ether also advantageously may act as the carrier for a small amount of a polymerization catalyst. Examples of polymerization catalysts which may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, etc., various per-compounds such as perborates, persulfates, perchlorates, etc., aluminum salts such as the halides, organic and inorganic acids such as methacrylic acid, hydrofluoric acid, etc., metal compounds of unsaturated acids as, for instance, cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the diallyl ether and the unsaturated alkyd resin is of secondary importance, copolymerization between these components may be effected merely under the influence of heat, light, or heat and light and in the absence of an accelerator of polymerization. The rate of copolymerization and the properties of the final product vary with the time, temperature and, if a catalyst is used, also with the catalyst concentration. Copolymerization may be effected at from room temperature (20°–30° C.) to temperatures above 100° C., for example, about 130° C., but ordinarily I use temperatures within the range of 60° to 120° C. in causing the mixed components to interpolymerize.

In order that those skilled in the art better may understand how the present invention may be carried into effect, the following examples thereof are given by way of illustration. All parts are by weight.

*Example 1*

| | Parts |
|---|---|
| Ethylene glycol itaconate | 18.0 |
| Diallyl ether | 2.0 |
| Benzoyl peroxide | 0.2 |

A solution of the ethylene glycol itaconate (unsaturated alkyd resin) and the diallyl ether, in which latter the benzoyl peroxide previously had been dissolved, was heated for 60 hours at 65° C. The copolymer was a hard clear, insoluble infusible, almost colorless mass. At 130° C. the mixed components formed, on a hot plate test of a small sample, a hardened interpolymer in less than 60 seconds.

The ethylene glycol itaconate of this example was prepared by esterifying 52 parts itaconic acid with 23 parts ethylene glycol. The components were mixed and slowly heated in the course of one hour from room temperature to 190° C. in a nitrogen atmosphere, and held at that temperature for about 3 to 5 hours.

*Example 2*

Same components, proportions and procedure as in Example 1 except that the specific diallyl ether employed was dimethallyl ether. The interpolymerization product was a hard, translucent mass.

*Example 3*

| | Parts |
|---|---|
| Acetic-anhydride-modified diethylene glycol maleate | 18.0 |
| Diallyl ether | 2.0 |
| Benzoyl peroxide | 0.2 | were treated as described under Example 1. At the end of 60 hours at 65° C. a clear, insoluble, rubbery mass was formed, while at the end of 108 hours the copolymer was hard and clear.

The unsaturated alkyd resin of this example was prepared by heating under reflux for 1 hour, in a nitrogen atmosphere, 88 parts maleic anhydride, 106 parts diethylene glycol and 10 parts acetic anhydride. The reaction mass was then brought to 190° C., which temperature was maintained for about 4 to 6 hours.

*Example 4*

Same as Example 3 except that dimethallyl ether was employed, yielding a clear, slightly rubbery copolymer after 108 hours' heating at 65° C.

*Example 5*

| | Parts |
|---|---|
| Acetic-anhydride-modified diethylene glycol itaconate | 18.0 |
| Diallyl ether | 2.0 |
| Benzoyl peroxide | 0.2 | were treated as described under Example 1, yielding a clear, very hard, almost colorless interpolymer after 60 hours' heating at 65° C.

The unsaturated alkyd resin of this example was prepared by heating under reflux for 3 hours, in a nitrogen atmosphere, 65 parts itaconic acid, 33 parts ethylene glycol and 6 parts acetic anhydride. The reaction mass was then brought to 180°–190° C., which temperature was maintained for about 2 to 4 hours.

*Example 6*

Same as Example 5 except that dimethallyl ether was employed. The copolymer obtained by heating the components for 60 hours at 65° C. was hard, clear and almost colorless.

*Example 7*

| | Parts |
|---|---|
| Diethylene glycol maleate | 18.0 |
| Diallyl ether | 2.0 |
| Benzoyl peroxide | 0.2 | were treated as described under Example 1, yielding a hard, clear, almost colorless interpolymer after 60 hours' heating at 65° C.

It will be understood, of course, that my invention is not limited to interpolymerization products obtained by copolymerizing the specific copolymerizable materials above mentioned by way of illustration. Thus, instead of diallyl ether or dimethallyl ether I may use, for example, such allyl ethers as the allyl methallyl, the allyl ethallyl, the di-ethallyl, the methallyl ethallyl, the allyl propallyl, the dipropallyl, the methallyl propallyl, the ethallyl propallyl, the allyl butallyl, the methallyl butallyl, the ethallyl butallyl, the propallyl butallyl, the dibutallyl, the allyl amallyl, the methallyl amallyl, the ethallyl amallyl, the propallyl amallyl, the butallyl amallyl, the diamallyl, etc.

Likewise the present invention is not limited to the specific unsaturated alkyd resins given by way of illustration in the above examples. Thus, I may use the esterification products of, for example, Diethylene glycol (160 parts) and maleic anhydride (147 parts)

Diethylene glycol (106 parts) and itaconic acid (130 parts)

Glycerine (18.4 parts) and itaconic acid (39 parts)

Thiodiglycol (24 parts) and itaconic acid (26 parts)

Glycerine (20 parts), itaconic acid (29 parts) and phthalic anhydride (11 parts)

Diethylene glycol (20 parts), itaconic acid (18.2 parts) and succinic acid (7.08 parts)

Ethylene glycol (20 parts), maleic anhydride (29.4 parts) and succinic acid (3.3 parts)

Diethylene glycol (30.6 parts), maleic anhydride (17.6 parts) and itaconic acid (15.6 parts)

Glycerine (18.4 parts) and maleic anhydride (29.4 parts)

Diethylene glycol (30.3 parts), maleic anhydride (13.2 parts) and phthalic anhydride (21.7 parts)

Glycerine (25.76 parts) maleic anhydride (13.72 parts) and phthalic anhydride (20.72 parts)

Ethylene glycol (18 parts) and maleic anhydride (27.4 parts)

Also, polymerization catalysts other than benzoyl peroxide may be employed, for instance accelerators of polymerization such as hereinbefore mentioned.

In certain cases, instead of copolymerizing a single diallyl ether with a single unsaturated alkyd resin, I may copolymerize a plurality of diallyl ethers with either a single unsaturated alkyd resin or with a plurality of unsaturated alkyd resins. In this way it is possible to obtain a composition comprising a mixture of interpolymers best adapted to meet a particular service application.

Although in the foregoing examples I have shown an interpolymerization product of a relatively small amount (approximately 10 per cent by weight of the whole) of a diallyl ether with an unsaturated alkyd resin, it will be understood of course that the invention is not limited to these particular proportions of components. Mainly for economic reasons I prefer that the diallyl ether does not exceed substantially 50 per cent by weight of the mixed polymerizable materials, but the use of higher amounts is not precluded, as for example up to 70 or 75 per cent by weight of the whole. Although the incorporation into a polymerizable unsaturated alkyd resin of as little as 1 or 2 per cent of a diallyl ether appears to accelerate the cure of such alkyd resins, and to yield products of improved properties as compared with an unsaturated alkyd resin which has been cured (converted to an insoluble, infusible state) in the absence of a diallyl ether, somewhat better results are obtained when the diallyl ether constitutes at least 5 per cent by weight of the mixed starting components.

The interpolymerization products of this invention have a wide range of properties. Depending upon the particular diallyl ethers and unsaturated alkyd resins employed, the particular proportions thereof, the nature of the polymerization influences and the extent of the interpolymerization, they vary from soft, flexible, soluble bodies to hard, rigid masses of varying resistance to solvents. In intermediate stages of copolymerization some form fluid compositions of varying intrinsic viscosities and may be so used. For coating or impregnating applications where the presence of a small amount of solvent in the cured composition is not objectionable, the mixed polymerizable materials may be diluted with volatile or non-volatile solvents to viscosities best adapted to meet the particular service application, and then may be copolymerized after application of the solution to the particular article to be coated or impregnated. By suitable selection of the starting materials and the conditions of interpolymerization, interpolymers can be obtained in an insoluble infusible state practically resistant to the destructive effect of other chemical bodies such as acids, bases, solvents and the like.

These new organic plastic materials may be used alone or with fillers or other modifying agents in casting and molding applications. The modified or unmodified copolymers also may be used as adhesives, impregnants and surface coating materials. In such applications the mixed components, without added solvent, may be applied to the object to be treated and subjected to polymerization influences as hereinbefore described, with or without the application of pressure, to form the copolymer in situ. Thus, they may be used as impregnants for many porous bodies, such as cork, pottery, felts, or fabricated bodies with interstices, such as the windings of electrical coils, netted fiber, interwoven fibrous materials, etc. They also may be used for protectively coating impervious articles such as metals, or for coating or coating and impregnating articles such as paper, wood, cloth, glass fibers, concrete, synthetic boards, etc. They also may be employed in the production of wire enamels and winding tapes. The mixed components or partial interpolymers thereof, with or without modifying agents, may be cast and molded under heat or under heat and pressure. They also may be molded by injection, extrusion or compression molding technique whereby they are heat- and pressure-hardened to yield numerous molded articles of manufacture for industrial, household and novelty uses.

What I claim as new and desire to secure by Letters Patent of the United States, is:

1. A polymerizable composition comprising a diallyl ether and an unsaturated alkyd resin.

2. A composition comprising the product of polymerization of a mixture including a diallyl ether and an unsaturated alkyd resin.

3. A composition comprising an interpolymer of diallyl ether and an unsaturated alkyl resin.

4. A composition comprising an interpolymer of dimethallyl ether and an unsaturated alkyd resin.

5. As a new product, an insoluble and infusible copolymer of a diallyl ether and an unsaturated alkyd resin.

6. A product comprising an interpolymer of a diallyl ether and a polymerizable esterification product of ingredients comprising polyhydric alcohol and an alpha unsaturated alpha beta polycarboxylic acid, said diallyl ether constituting from 1 to 75 per cent by weight of the mixed starting components.

7. A composition comprising an interpolymer resulting from the polymerization of a mixture including a diallyl ether and a polyhydric alcohol ester of maleic acid.

8. A composition comprising an interpolymer resulting from the polymerization of a mixture including a diallyl ether and a polyhydric alcohol ester of fumaric acid.

9. A composition comprising an interpolymer resulting from the polymerization of a mixture including a diallyl ether and a polyhydric alcohol ester of itaconic acid.

10. A composition comprising an interpolymer resulting from the polymerization of a mixture including a diallyl ether and a polymerizable esterification product of a polyhydric alcohol, an alpha unsaturated alpha beta polycarboxylic acid and a polycarboxylic acid selected from the class consisting of saturated aliphatic polycarboxylic acids and aromatic polycarboxylic acids, said diallyl ether constituting from 5 to 50 per cent by weight of the mixed starting components.

11. As a new product, an interpolymer of diallyl ether and diethylene glycol maleate.

12. As a new product, an interpolymer of dimethallyl ether and ethylene glycol itaconate.

13. As a new product, an interpolymer of diallyl ether and the esterification product of diethylene glycol, maleic anhydride and acetic anhydride.

14. The method of producing new compositions especially adapted for molding, coating and adhesive applications which comprises mixing at least one diallyl ether with at least one unsaturated alkyd resin and treating the resulting mixture to effect copolymerization between the said components.

15. A composition comprising an interpolymer resulting from the polymerization of a mixture containing a diallyl ether and a polymerizable esterification product of ingredients comprising a dihydric alcohol and an alpha unsaturated alpha beta dicarboxylic acid.

GAETANO F. D'ALELIO.

CERTIFICATE OF CORRECTION.

Patent No. 2,288,315.                                              June 30, 1942.

GAETANO F. D'ALELIO.

It is hereby certified that error appears in the printed specification of the above numbered patent requiring correction as follows: Page 4, first column, line 26, claim 3, for "alkyl" read --alkyd--; line 35, claim 6, after "comprising" insert --a--; and that the said Letters Patent should be read with this correction therein that the same may conform to the record of the case in the Patent Office.

Signed and sealed this 1st day of September, A. D. 1942.

Henry Van Arsdale,
Acting Commissioner of Patents.

(Seal)